Feb. 25, 1930.   H. B. CHALMERS   1,748,110
VARIABLE SPEED POWER TRANSMISSION
Filed Dec. 5, 1928    2 Sheets-Sheet 1
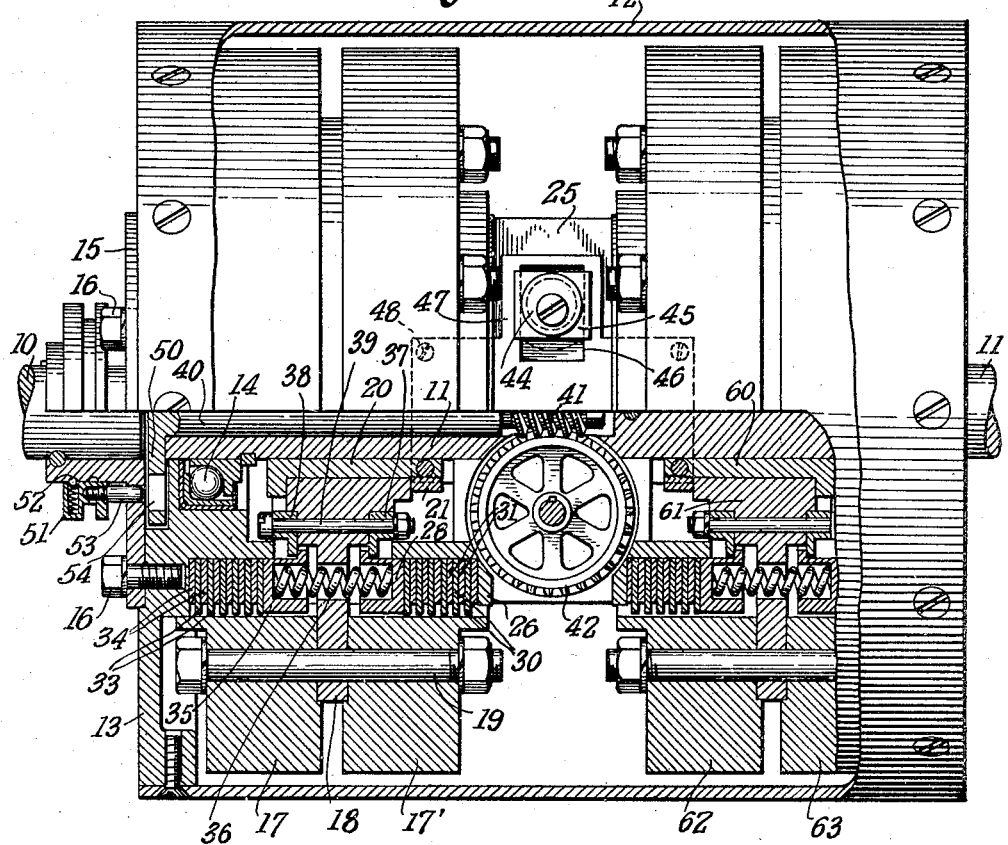
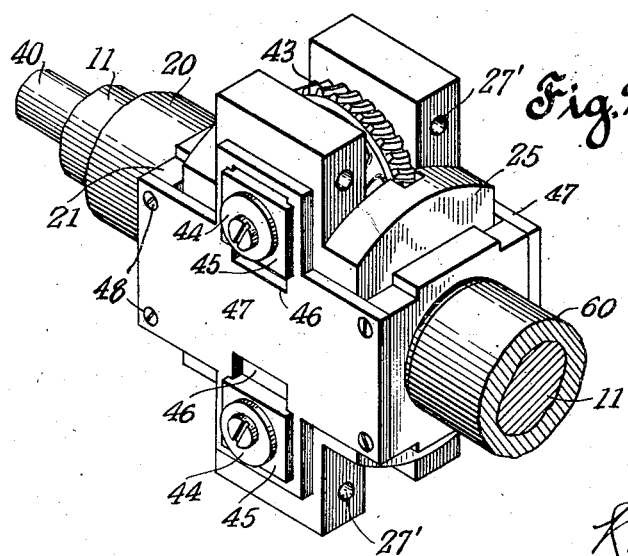
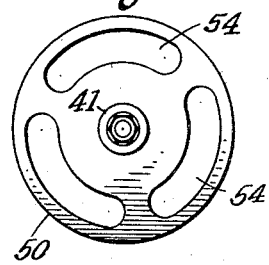
INVENTOR
Henry B. Chalmers
BY
ATTORNEY

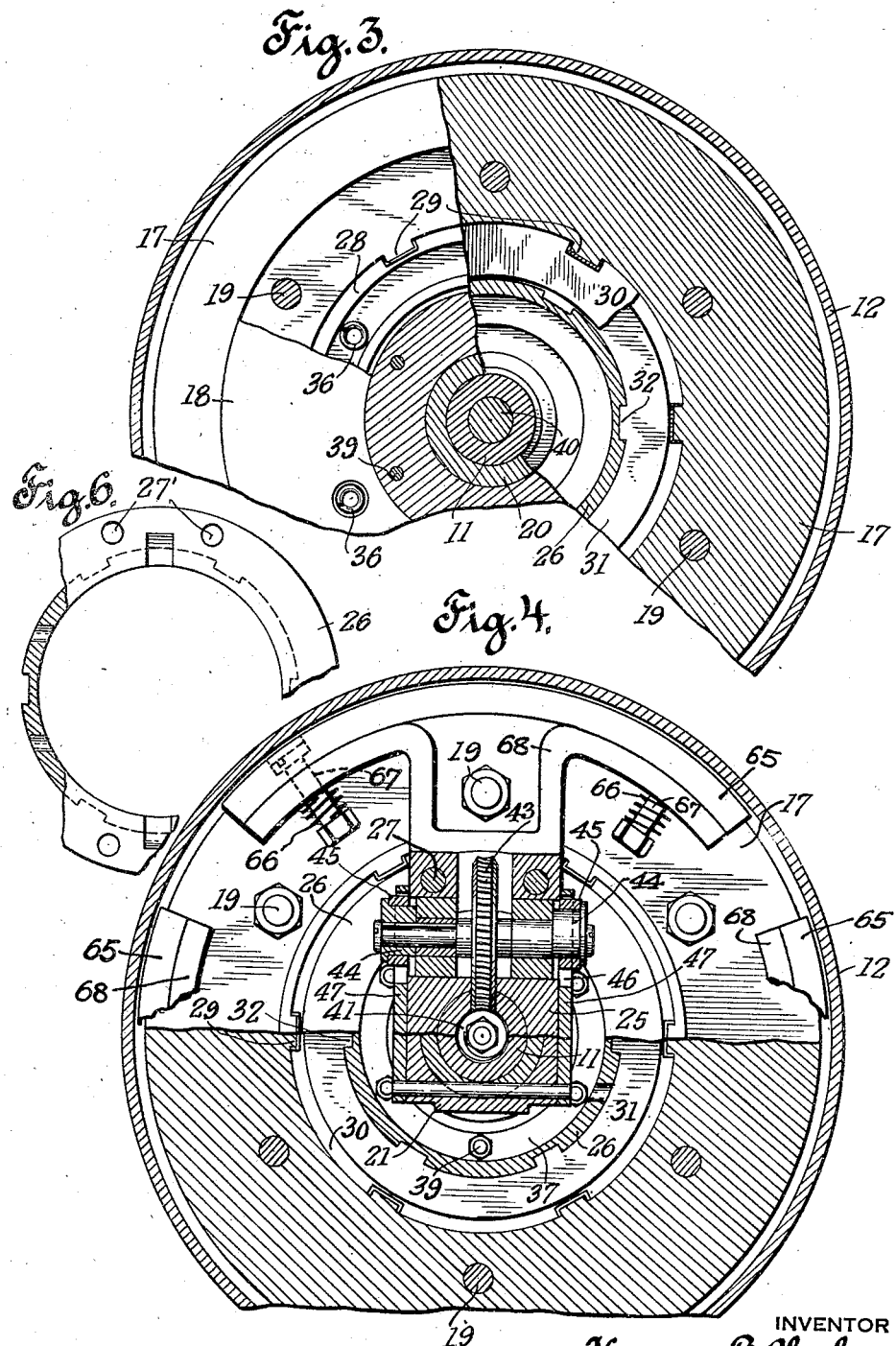

Patented Feb. 25, 1930

1,748,110

UNITED STATES PATENT OFFICE

HENRY B. CHALMERS, OF NEW YORK, N. Y.

VARIABLE-SPEED POWER TRANSMISSION

Application filed December 5, 1928. Serial No. 323,950.

One object of my present invention is to provide a mechanism in which the power will be transmitted at a speed varying substantially inversely with the load.

Another object is to provide a mechanism in which the torque transmitted is uni-directional under any given operating condition.

Another object is to provide a mechanism of this character as free as possible from vibration.

Another object is to provide a mechanism of the character described utilizing rotary friction instead of direct impact as the transmitting force.

Another object is to provide mechanism in which the torque or stress in the driven member increases substantially in inverse ratio to its speed as well as in substantially direct ratio to the speed of the driving member.

In the form of mechanism herein shown and described I employ two inertia masses for alternately transmitting power from the driving to the driven member. These masses are intermittently and alternately coupled with the driving and driven member by means of clutch devices.

Fig. 1 is a side view and partial longitudinal section showing one form of apparatus embodying my invention.

Fig. 2 is a perspective view of part of the clutch actuating mechanism.

Fig. 3 is an end view and partial section showing parts broken away to show the inertia mass and clutch mechanism.

Fig. 4 is a similar view showing parts of the clutch actuating mechanism.

Fig. 5 is a detail end view of the intermediate control shaft and its flange.

Fig. 6 is an end view and partial section of one of the clutch sleeves.

The power is transmitted from the driving shaft 10 to the driven shaft 11, which is arranged in alignment therewith. The casing 12 and attached parts are connected with the driving shaft and serve as a fly wheel. This casing has a head 13 at each end suitably secured to the outer wall. A suitable bearing 14 is interposed between each head 13 and the shaft 11. A collar 15 is secured on the driving shaft 10 and keyed to it in any suitable manner so that the collar will always rotate with the driving shaft. This collar is secured to the left hand end 13 of the casing in any suitable manner, as for instance, by screws or bolts 16.

Each of the principal inertia masses consists of two rings or discs such as 17 and 17' with an interposed hub member 18, all secured together by a number of bolts 19 and supported on the bushing 20, which in turn is supported on the shaft 11 so that it may move longitudinally on the shaft a short distance. A nut 21 screwed on at the end of the bushing 20 and anchored in place, holds the hub 18 on the bushing.

An abutment block 25 is keyed or pinned to the driven shaft 11 in any suitable manner so that the abutment block and shaft have no relative rotational or reciprocating movement. A clutch sleeve or collar 26 is secured to the abutment block 25, for instance, by rivets 27 extending through holes 27'. Clutch ring 28 is arranged opposite the flange of the sleeve 26 and provided with notches to receive the lugs 29 which project inwardly from the mass 17'. Between the flange of the sleeve 26 and the ring 28 are a series of clutch plates 30 and 31. The former are interlocked with the lugs 29 of the mass 17' and the latter have lugs 32 which are interlocked with the sleeve 26 so that the larger friction rings or clutch plates 30 always rotate with the inertia mass 17' and the smaller rings 31 always rotate or remain stationary with collar member 26 on the abutment block.

A similar set of clutch parts 33 and 34 are arranged on the opposite side of the hub member 18 and connected respectively with the mass 17 and the head 13 so that the clutch members 34 always rotate with the driving member and the clutch members 33 travel with the mass 17. A clutch ring 35 corresponds with ring 28 and between them is arranged a series of springs 36. Flange rings 37 and 38 are secured to the hub 18 by bolts 39 so as to limit the separation of the clutch rings 28 and 35.

The inner end of the driven shaft 11 is hollow and houses an intermediate shaft 40 which has a worm thread 41 meshing with the worm gears 42 and 43 whose shafts are supported in the abutment block 25. Each worm gear has on the outer end of its shaft an eccentric or cam 44, each rotatable in a block 45 which slides in a slot 46 in plate 47. This plate 47 is secured to the inner end of the bushing 20 by a pair of screws or pins 48.

The outer or left end of the worm shaft 40 is provided with a flange 50 adjacent the collar 15 on the end of the driving shaft 10. A ring 51 is mounted on the hub of the collar 15 so that it can be moved or shifted longitudinally by means of a fork or any other suitable shifting mechanism. The spring pressed ball catch 52 serves to yieldingly hold the shifting ring 51 in any position desired.

This ring 51 is provided with a number of pins 53 which are adapted to be thrust through the flange of the collar 15 and into the slots 54 in the flange 50 of the worm shaft 40.

The opposite end of the mechanism is provided with a bushing 60 which slides on the shaft 11 and is connected to the plates 47 in the same manner in which these plates are secured to the bushing 20. Another inertia mass is mounted in the bushing 60 and consists of a hub member 61 and the rings or discs 62 and 63. Clutch mechanisms similar to those previously described are interposed between the abutment block 25 and the right hand head of the casing 12 and serve to intermittently receive and deliver energy.

When the parts are in the position shown in Fig. 1, the driving shaft 10 rotates the casing 12 but does not transfer energy to the shaft 11.

When the shifter ring is moved to the right the pins 53 engage in the openings 54 of the worm shaft 40 so that the worm 41 is driven by it, thus rotating the two worm gears 42 and 43 and their eccentrics 44. The rotation of these ecccntrics in the slide blocks 45 causes a longitudinal movement of the plates 47 with respect to the abutment block 25, thus sliding, for instance, the bushing 20 and the hub member 18 toward the left. This permits the springs 36 to act and compress the friction clutch rings 33 and 34 together, thus allowing the driving head 13 to transmit energy to the mass 17, 17', etc. through the clutch rings. During this period of compression of the clutch rings 33 and 34, the clutch rings 30 and 31 remain substantially free.

As the worm gears 42 and 43 continue to rotate, their eccentrics 44 move the plates 47 toward the right, thus moving the bushing 20 and hub 18 and masses 17 and 17' so as to permit springs 36 to thrust the plates or rings 30 and 31 into engagement and release the rings 33 and 34. As the parts 30 and 31 come into engagement the inertia of the masses 17, 17', etc. transmits energy from the clutch rings 30 and 31 to the clutch sleeve 26 and the abutment block 25 on the driven shaft 11.

The same action takes place between the right hand end of casing 12 and the abutment block 25 and on the opposite phase, so that when the left hand inertia mass is receiving kinetic energy from the driver the right hand mass is giving up its energy to the driven member and vice versa. Thus the driving member is intermittently transmitting its energy to the driven member and always with torque applied in the same direction. This torque is substantially inversely proportional to the load or resistance to movement of the driven member.

One of the most important uses of this transmission is for coupling electric motors to their loads, thus avoiding the oversize needed for starting torque and allowing the motor to attain its proper speed without any load before throwing in the transmission.

For use on automobiles (and in various other cases) it is sometimes desirable to combine with such transmission a centrifugal clutch to begin to operate at a suitable speed of the driven shaft (in automobiles that speed corresponds to say 15 miles per hour) to bring the entire mechanism into uniform speed. This clutch may be installed on the abutment and grip the casing in the form shown. Such automatic clutch may be of any well known or suitable type for instance shoes 65 normally pressed inwardly by springs 66 on pins 67 guided in the frame 68 supported on abutment block 25 on the driven member. When the speed reaches the predetermined amount, centrifugal force throws the shoes outwardly into engagement with the casing 12 which is a part of the driving member thus coupling the driving member to the driven member independently of the clutch members 33 and 34.

I claim:

1. Transmission mechanism comprising driving and driven parts, a number of inertia masses adapted to transmit energy from the driving to the driven parts, friction mechanism interposed between the driving and the driven parts and the inertia masses, and means for intermittently coupling the inertia masses to the driving and driven parts and centrifugal clutch mechanism having members connected to the driving and driven parts for directly coupling the driving and driven parts at a predetermined speed.

2. Transmission mechanism comprising a driving shaft and a driven shaft, a casing driven by a driving shaft and surrounding a part of the driven shaft, a worm shaft supported in the driven shaft and adapted to be coupled to the driving shaft, an abutment member carried by the driven shaft, worm gears carried by the abutment member and meshing with the worm shaft, inertia masses mounted on the driven shaft, clutch mechanism interposed between said abutment member and the heads of the casing and coacting with the inertia masses, said clutch mechanism being actuated by said worm gears.

3. Transmission mechanism comprising a driving shaft, a driven shaft in alignment therewith, a bushing on the driven shaft, a head on the driving shaft, an inertia mass consisting of a hub member mounted on the bushing and two rings secured to the hub member, an abutment collar mounted on the driven shaft and clutch mechanism interposed between said collar and said head and coacting with said inertia mass.

4. Transmission mechanism comprising a driving member, a driven member, coaxially mounted inertia masses, clutch mechanism for connecting one of said masses to the driving member and to said driven member and clutch mechanism for connecting the other mass to said driving member or to said driven member and means for alternately actuating said clutch mechanisms.

5. Transmission mechanism comprising driving and driven parts, two inertia masses adapted to transmit energy from the driving to the driven parts, clutch mechanism interposed between the driving and the driven parts and the two inertia masses, and means for alternately coupling the inertia masses to the driving and driven parts.

6. Transmission mechanism comprising a driving shaft and a driven shaft, a member driven by the driving shaft and having two clutch parts, an extension shaft extending into the driven shaft and coupled to the driving shaft, an abutment member on the driven shaft, gears carried by the abutment member and driven by the extension shaft, inertia masses mounted on the driven shaft, clutch parts interposed between said abutment member and the clutch parts driven by the driving shaft and coacting with the inertia masses, said clutch parts being actuated by said gears.

7. Transmission mechanism comprising a driving shaft, a driven shaft in alignment therewith, bushings on the driven shaft, two heads on the driving shaft, inertia masses, each consisting of a hub member mounted on a bushing and two rings secured to the hub member, abutment collars mounted on the driven shaft and clutch mechanism interposed between said collars and said heads and coacting alternately with said inertia masses.

8. Transmission mechanism comprising a driving member, a driven member, coaxially mounted inertia masses, clutch mechanism for connecting the driving member to one of said masses and to said driven member and clutch mechanism for connecting the other mass to said driving member and to said driven member, means for actuating said clutch mechanisms and means for coupling the driving and driven members independently of the said clutch mechanisms.

9. Transmission mechanism comprising driving and driven parts, two inertia masses adapted to transmit energy from the driving to the driven parts, friction clutch mechanisms interposed between the driving and the driven parts and the two inertia masses, and means for alternately and intermittently coupling the inertia masses to the driving and driven parts.

10. Transmission mechanism comprising a driving shaft and a driven shaft, a member driven by the driving shaft and having two clutch parts, an extension shaft extending into the driven shaft, movable means for coupling said extension shaft to the driving shaft, an abutment member on the driven shaft, means carried by the abutment member and driven by the extension shaft, inertia masses mounted on the driven shaft, clutch parts interposed between said abutment member and the clutch parts driven by the driving shaft and coacting with the inertia masses, said clutch parts being actuated by said means.

11. Transmission mechanism comprising a driving shaft, a driven shaft in alignment therewith, bushings on the driven shaft, two heads on the driving shaft, inertia masses, each consisting of a hub member mounted on a bushing and two rings secured to the hub member, abutment collars mounted on the driven shaft, an abutment on the driven shaft interposed between said collars and clutch means coacting alternately with said inertia masses and said shafts.

12. Transmission mechanism comprising a driving member, a driven member, coaxially mounted inertia masses, clutch mechanism for connecting one of said masses to the driving member and to said driven member, clutch mechanism for connecting the other mass to said driving member and to said driven member, means for actuating said clutch mechanisms and means for coupling the driving and driven members to the said clutch mechanisms.

HENRY B. CHALMERS.